Figure 1:
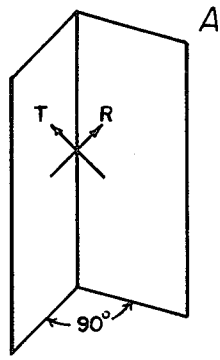

United States Patent [19]
Dunn

[11] 4,106,014
[45] Aug. 8, 1978

[54] RADAR SET SENSITIVE TO TARGET SHAPE

[75] Inventor: Ralph L. Dunn, Neptune, N.J.

[73] Assignee: The United States of America as represented by the Secretary of the Army, Washington, D.C.

[21] Appl. No.: 650,156

[22] Filed: Jun. 26, 1967

[51] Int. Cl.$^2$ .............................................. G01S 9/02
[52] U.S. Cl. ........................... 343/5 SA; 343/100 PE
[58] Field of Search ................... 343/100 PE, 5, 5 SA

[56] References Cited
U.S. PATENT DOCUMENTS

| | | | |
|---|---|---|---|
| 2,851,681 | 9/1958 | Cohn | 343/100.3 X |
| 2,953,781 | 9/1960 | Donnellan et al. | 343/100.3 |
| 2,991,417 | 7/1961 | Papp | 343/100.3 UX |
| 3,001,193 | 9/1961 | Marie | 343/100.3 |
| 3,049,703 | 8/1962 | Davis | 343/100.3 UX |
| 3,224,002 | 12/1965 | Carre | 343/100.3 X |
| 3,234,547 | 2/1966 | Katzin | 343/100.3 UX |
| 3,268,891 | 8/1966 | Atlas | 343/100.3 UX |
| 3,945,005 | 3/1976 | Dunn | 343/100 PE X |
| 4,053,891 | 10/1977 | Opitz | 343/5 SA |

Primary Examiner—T.H. Tubbesing
Attorney, Agent, or Firm—Nathan Edelberg; Sheldon Kanars; Jeremiah G. Murray

[57] ABSTRACT

The circuitry includes a pulse radar set including a transmitter and a first receiver which share a common antenna which is arranged to both launch and receive plane polarized waves at 45° to the earth's surface. A second antenna and receiver are arranged to respond only to target echoes polarized orthogonally to those transmitted. Means are provided to measure and compare the amplitudes of the target echoes which arrive with the two orthogonal polarizations and the shape of the target can be inferred from such measurements.

2 Claims, 2 Drawing Figures

RADAR SET SENSITIVE TO TARGET SHAPE

This invention relates to a novel and useful radar set and more particularly to a pulse radar set which can be used to differentiate between different targets on the basis of their different radar reflecting properties caused by differences in shape. The invention therefore falls into the field known as target signature analysis. Such analysis has been used in the past for determining the size, shape and tumbling rate of targets such as rockets and satellites. For example, as an orbiting satellite tumbles it presents a periodically varying radar cross-section if it is not spherical in shape, and the varying cross-section will cause the video echo pulse train to be amplitude modulated. The period of this modulation is the tumbling period of the satellite and the shape of the amplitude modulation depends on the target shape. Thus a tumbling cylindrical satellite will modulate the echo pulse train differently than will a conically shaped satellite. The present invention comprises circuitry which can be used to differentiate between targets on the basis of the different effect of differently-shaped targets on the polarization characteristics of a radar signal. More specifically, it has been found that targets comprising diplanes, this is: reflecting planes inserting at angles of approximately 90°, will reflect a substantial amount of energy orthogonally to the incident transmitted polarization if the incident polarization is at a 45° angle to the diplane line of intersection. The novel circuitry disclosed herein comprises a radar set in which a linearly polarized wave is transmitted at an angle of 45° to the horizontal and the relative amplitudes of the target echoes at the transmitted polarization of 45° and at an angle orthogonal thereto are compared. If the orthogonally polarized echo signals are greater in amplitude than those at the transmitted or parallel polarization for a substantial percentage of time, this is an indication that the target contains a number of diplanes with their lines of intersection either vertical or horizontal. Experimentally, it has been found that military vehicles with their box-like construction will return stronger orthogonal components than will other targets such as civilian automobiles of streamlined construction. The radar set can thus be used to distinguish military from civilian vehicles.

It is thus an object of this invention to provide a radar set capable of differentiating between targets on the basis of the different effects of different targets on the polarization of a transmitted radar wave.

A further object of the invention is to provide a radar set capable of distinguishing a target having one or more reflecting diplanes from targets having smoothly curved edges.

Another object is to provide a radar set which can distinguish between military and civilian vehicles.

Figure 2:
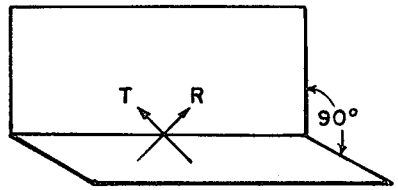
Figure 2:
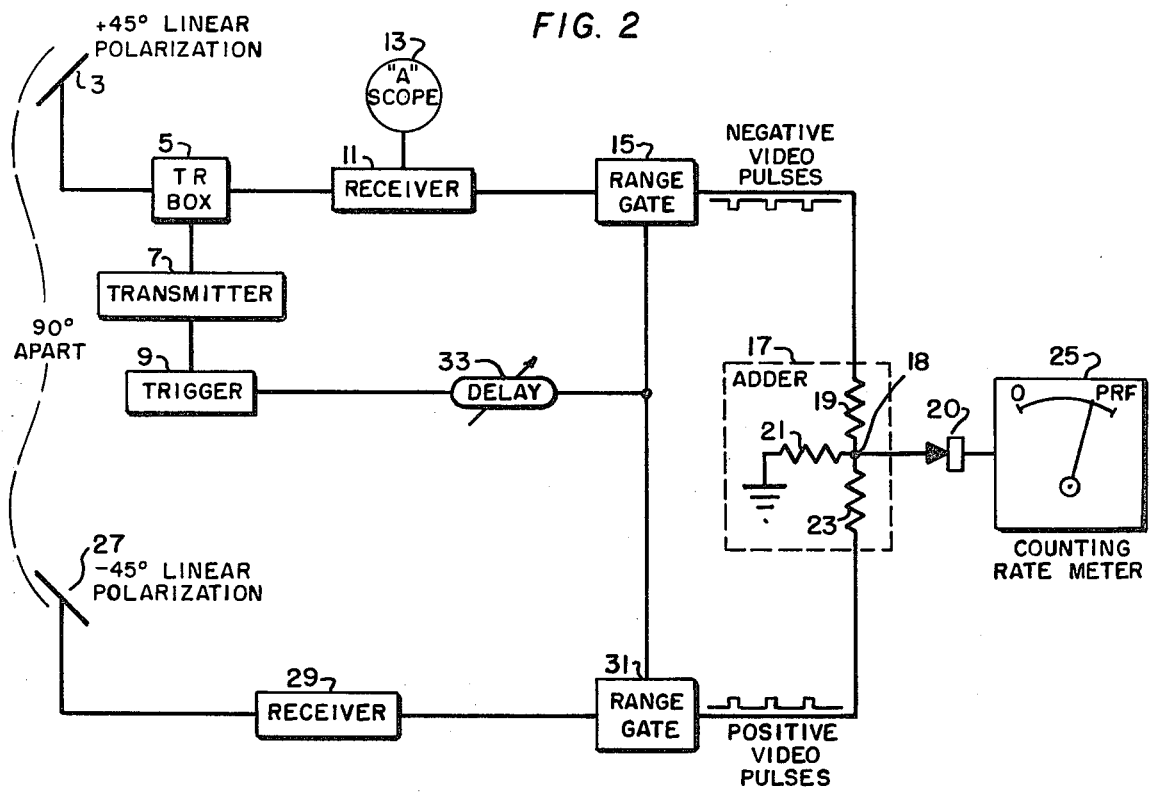

These and other objects and advantages of the invention will become apparent from the following detailed description and drawing, in which FIG. 1 illustrates a pair of diplanes, and FIG. 2 is a block diagram of a radar set embodying the concepts of the present invention.

In FIG. 1 the diplane 'a' is merely a pair of radar reflective plane surfaces which intersect at 90° and with the line of intersection vertical. The diplane 'b' is the same as 'a' except the line of intersection is horizontal. It has been found that radar echoes from such diplanes are extremely sensitive to the polarization of a transmitted radar wave. If the transmitted wave is plane polarized perpendicular to the line of intersection of the diplane, the echo signal polarization will be reversed or changed by 180°. If the transmitted wave is plane polarized parallel to the line of intersection, the echo signal polarization will be the same as that of the transmitted wave. If the transmitted wave is polarized at a 45° angle to the diplane line of intersection, such a transmitted wave can be resolved into two equal components, one parallel to and the other perpendicular to the diplane line of intersection. The parallel component will be reflected with unchanged polarization and the perpendicular component will have its polarization reversed by 180°, as explained above. These two reflected components will vectorially combine to form a single echo signal with a polarization orthogonal to or rotated by 90° from that of the transmitted wave. Such a transmitted wave T and its reflection R from the diplanes of FIG. 1 are indicated by the arrows therein. The radar set of FIG. 2 takes advantage of this law of reflection from diplanes to detect targets containing diplanes disposed horizontally or vertically as shown in FIG. 1.

The circuitry of FIG. 2 comprises a pulse radar set including a transmitter and a first receiver which share a common first antenna which is disposed so as to both launch and receive waves plane polarized at an angle of 45° to the earth or to the horizontal. The circuitry further comprises a second radar receiver with a receiving antenna adapted to receive waves polarized orthogonally to those transmitted and received by the first antenna. Further circuitry includes means to compare the video target echoes of the two receivers and to generate a pulse whenever the video pulse amplitude of the second receiver exceeds that of the first receiver, and means to count the number of such generated pulses. The number of such pulses relative to the pulse repetition frequency of the radar set is an indication of the number and prominence of vertical and horizontal diplanes on the target. In FIG. 2, the first antenna is connected to TR box (or duplexer) 5 which alternately connects the radar set transmitter 7 and the first radar receiver 11 to the antenna 3. The receiver 11 has connected thereto an A-scope 13 or other suitable display device for indicating target echoes at all ranges. The microwave pulses from the transmitter are initiated by the trigger circuit 9 connected thereto. The receiver 11 produces at its output a train of negative video target pulses. The range gate 15 at the receiver output selects targets at any desired range. The range gate pulse is obtained by delaying the output of trigger circuit 9 by means of variable delay means 33, which is set for the desired range. The second receiver 29 is tuned to the same frequency as the radar set just described and its antenna 27 is arranged to respond only to waves polarized orthogonally to those emitted and received by the first antenna 3. Thus the orientation of the second antenna is at an angle of −45°. The second receiver 29 is arranged to produce positive target video pulses. A range gate 31 similar to gate 15 is connected to the output of receiver 29. The rest of the circuitry comprises means to compare the relative amplitudes of the received target echoes. This circuitry in the illustrative example includes an adder 17, to which the two video pulse trains are applied. This circuit may comprise merely a three-resistor matrix as illustrated. Since the two video pulse trains are of opposite polarity, the polarity at the output terminal 18 of the adder will be that of the larger of the two video pulses simultaneously applied to the adder. A diode 20 with its anode connected to the terminal 18 will pass only positive voltages from the adder to counting rate meter 25. Pulses will thus be applied to the counting rate meter only if the amplitude of the positive video pulse from the second receiver exceeds the amplitude of the simultaneously applied negative pulse from the first receiver. The counting rate meter includes a scale with maximum calibration equal to the pulse repetition frequency of the radar set, which is the frequency of the trigger circuit 9. The meter 25 may be calibrated from 0 to 100% in which case the meter reading would indicate the percentage of the target pulses from the second receiver 29 which exceeded in amplitude those of the first receiver.

The operation of the circuit is as follows: If the two antennas are directed at a target comprising a flat reflective surface and the flat surface is normal to the radar beam, the reflected echo signal will have the same polarization as the transmitted signal. Thus the target echoes will arrive with a polarization parallel to the antenna 3 and perpendicular to that of antenna 27. The receiver 29 will have no output in such case and the negative video output pulses from receiver 11 will be blocked by diode 21. The meter 25 in such a case will read zero. If the target is either a vertical or horizontal diplane as shown in FIG. 1, all of the target echoes will return with a 90° change in polarization relative to the transmitted polarization, as explained above. The antenna 3 will not respond to such orthogonal polarization, however the antenna 27 is oriented to respond to such polarized waves. Thus the first receiver 11 will have no output and the positive video pulses of the second receiver 29 will be passed through diode 20 to meter 25, which will indicate a maximum reading since every received pulse is counted. Ideal targets such as the two described above are seldom encountered in actual operation of radars; however actual targets usually have some dominant reflective feature which approximates one of these idealized targets. As stated above, the box-like construction of military vehicles includes several diplanes disposed both vertically and horizontally, for instance the window frames. Such a target will return strong orthogonal components as long as the radar beam is not directed squarely at any of the flat surfaces of the vehicle. Practical targets will generally return echoes polarized both parallel to and orthogonal to the transmitted polarization, however if the orthogonal components predominate for a certain percentage of the echo pulses, a target of prominent diplane construction is indicated. The counting rate meter of FIG. 2 indicates the percentage or proportion of the orthogonal target echoes which are larged in amplitude than parallel polarized target echoes and the meter reading is thus an indication of the prominence of diplanes reflecting areas of the target. Tests made by the inventor have shown that for a 2½ ton Army truck the orthogonal component of the target signal exceeded the parallel component for 37 out of 48 echoes; for a ¾ ton Army truck for 28 out of 48 echoes and for a civilian automobile for 17 out of 48 echoes. Thus the military vehicles returned larger orthogonal components over 50% of the time, whereas the civilian automobile returned larger orthogonal components substantially less than 50% of the time. Thus a reading of less than 50% on the meter 25 would indicate a target such as a civilian auto whereas a reading of over 50% would indicate a box-like structure characteristic of a military vehicle.

While the invention has been described in connection with an illustrative embodiment, obvious modifications thereof are possible without departing from the inventive concepts disclosed herein. Accordingly the invention should be limited only by the scope of the appended claims.

What is claimed is:

1. A pulse radar set comprising; a transmitter and a first receiver which share a common antenna, said first antenna being oriented so as to both launch and receive radar waves plane polarized at an angle of 45° to the earth's surface, a second receiver including a receiving antenna adapted to receive radar waves polarized orthogonally to those transmitted and received by said common antenna, and means connected to the outputs of said receivers to compare the video target echo amplitudes of the two receivers, and wherein said means comprises an adder to which the oppositely polarized outputs of said receivers are applied, and a counting rate meter connected to the output of said adder via a diode.

2. A radar set comprising; a pulse transmitter and a first receiver which share a common antenna, said first antenna being oriented so as to both launch and receive radar waves plane polarized at an angle of 45° to the earth's surface, a second receiver including a receiving antenna adapted to receive radar waves polarized orthogonally to those transmitted and received by said common antenna, said two receivers producing video target pulse trains of opposite polarity, an adder, means to apply the video target pulse train of each receiver to a different one of the inputs of said adder, a counting rate meter connected to the output of said adder via a diode, said diode being so poled that it applies the output of said adder to said counting rate meter only if the adder output polarity is the same as that of the video pulse train polarity of said second receiver.

* * * * *